Oct. 15, 1963 M. F. CARTER 3,106,969

DEVICE FOR FIRMING, GRADING AND SMOOTHING GROUND

Filed Aug. 11, 1961

INVENTOR
MARTIN F. CARTER
BY
*Lamont Johnston*
ATTORNEY

United States Patent Office 3,106,969
Patented Oct. 15, 1963

3,106,969
DEVICE FOR FIRMING, GRADING AND SMOOTHING GROUND
Martin F. Carter, Box 112, Rte. 3, Kingston, Tenn.
Filed Aug. 11, 1961, Ser. No. 130,983
2 Claims. (Cl. 172—197)

This invention relates to an agricultural implement and more particularly to a device for firming, grading and smoothing ground.

One object of this invention is to provide a device which will firm, grade and smooth soil.

Another object is to provide such a device which will form grooves in the soil to reduce erosion and prevent baking or crusting of the soil surface by the sun.

Other objects and advantages of the invention will be apparent from the following description, taken in conjunction with the accompanying drawings, in which.

Figure 1:
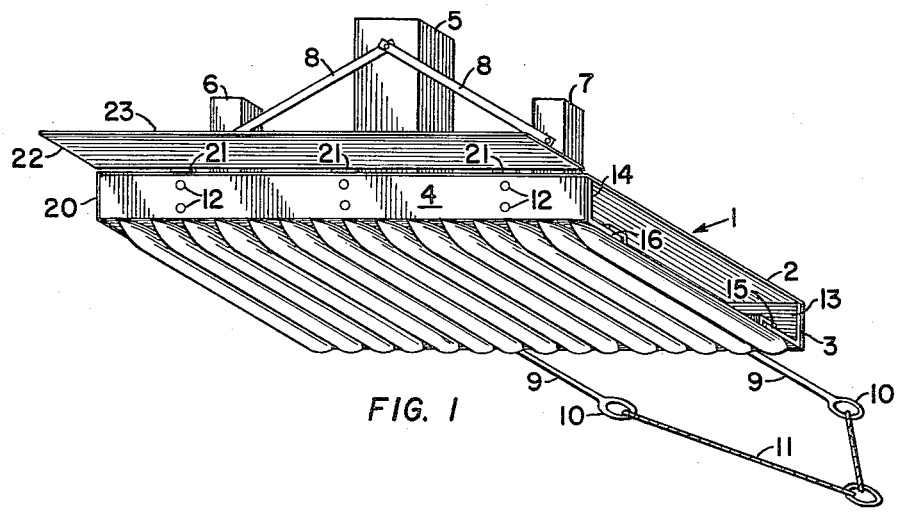
FIG. 1 is a perspective view from below showing one embodiment of this invention, with a scraper blade in mid-position for clarity of illustration.

In the drawings, there is shown a frame, generally indicated at 1, of rectangular shape, the frame including a top plate 2 and depending front and rear plates or aprons 3 and 4, either formed integrally with the plate 2 or attached thereto. Fixed to the plate 2 and extending upwardly therefrom are center and side frame posts 5, 6 and 7, suitable braces 8 being secured between the posts. The posts 5, 6 and 7 are formed with suitable attachment means, not shown, by which the implement may be attached to and lifted by the hydraulic or mechanical lift of a tractor. To the front apron 3 or the top plate 2 there are fixed suitable means, such as draft bars 9 having eyes 10 formed in their forward ends, to which a suitable draft bridle or attachment 11 of wire rope, chain, or the like, may be attached. The draft attachment 11 may be drawn by a tractor, mule or horse, not shown.

To the inner surfaces of the front and rear aprons 3 and 4 are secured by suitable means, such as bolts 12, a pair of spaced, parallel, transverse angle iron members 13 and 14, providing horizontally disposed, facing, ledges 15 and 16.

Figure 2:
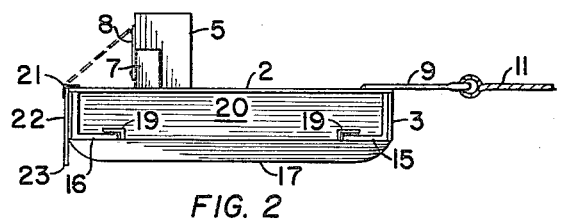
FIG. 2 is a side elevation of the embodiment shown in FIG. 1, with the blade in lowered position and showing in broken lines the upper position of the blade.
Figure 3:
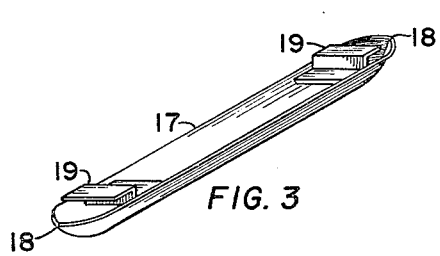
FIG. 3 is a perspective view from above of one of the V-shaped members, showing clips for attaching the member to ledges on the frame.
Figure 4:
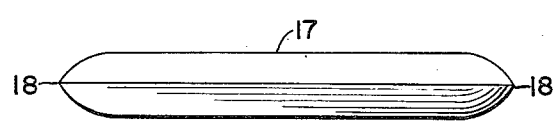
FIG. 4 is a bottom plan view of the V-shaped member shown in FIG. 3.

Slidably supported by the ledges 15 and 16 are plurality of V-shaped members or bars 17, which may be formed from angle irons. At least one, and preferably both, ends of each member 17 may be closed, as illustrated in FIGS. 3 and 4, like the bow of a vessel. For example, the sides of the member 17 may be cut on inclined lines, heated, bent and welded together at their ends to form prows or stems 18. Included within the member 17, near each of its ends, is a clip or attachment 19, the clips having free edges projecting horizontally in opposite directions, as illustrated in FIG. 3, toward the prows 18. The vertical clearances between the free edges of the clips 19 and the upper surfaces of the member 17 are just sufficient to receive the ledges 15 and 16 of the angle irons 13 and 14 and the clips 19 on each member are so spaced longitudinally from each other as to engage snugly the ledges 15 and 16. In this manner, each member 17 can be slidably attached to the ledges 15 and 16 by means of the clips 19. The clips may be welded onto the inner surfaces of the members 17. Alternatively, the member 17 and its clips 19 may be cast of mild steel, aluminum, or other suitable material, in one integral part. As illustrated in FIGS. 1 and 2, the ledges 15 and 16 may be left open at one side, but are closed at the other side by a side by a side plate 20 and a similar side plate may be attached, as by bolting, to the one side.

A modification of the structure described above involves the use of two or more of the members 17, with their clips 19, formed together as a unit. The members may be fabricated into an integral unit by casting, rolling, welding, or the like, and such a unit may prove to be less expensive in construction than the separate, individual members 17.

Adjacent the upper edge of the rear apron 4, there is attached to the upper surface of the plate 2 as by means of hinges 21, a scraping and smoothing blade 22. As illustrated in FIG. 2, when this blade 22 is swung downwardly, its outer edge 23 extends below the lowermost surfaces of the V-shaped members 17.

In use of the device as drawn by the traction attachment 11, the V-shaped members 17 press down into the soil to firm it and to form grooves in it, thereby reducing erosion and preventing baking or crusting of the soil surface by the sun. In such a use, the blade 22 may be pivoted upwardly to the broken line position shown in FIG. 2. When drawn in this manner, two or more of the implements can be used in tandem, either one behind the other or abreast, as when being pulled by a large tractor.

Figure 5:
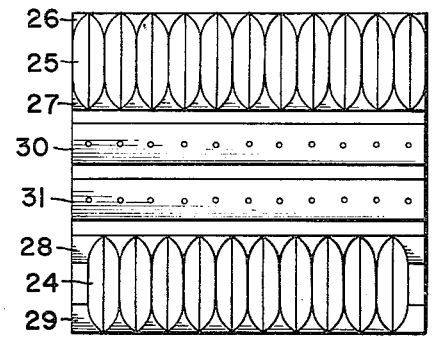
FIG. 5 is a bottom plan view of a modification of the device.

A modification of the basic structure is to form the device with two spaced rows of V-shaped members 24 and 25, as shown in FIG. 5, these members being shorter than but otherwise of the same construction as the members 17. In this modification there must be, of course, four parallel ledges 26, 27, 28 and 29. A fertilizer attachment 30 and/or a seeding attachment 31 may be mounted between the rows of members 24 and 25. It will be noted from FIG. 5 that the members 24 are staggered relative to the members 25 for covering the seed and/or fertilizer.

The implement is reversible in that it can also be attached by means of the posts 5, 6 and 7 to the hydraulic or mechanical lift of a tractor and drawn in the opposite direction, in which case the blade 22 is pivoted downwardly to the full line position of FIG. 2. For example, after the ground has been worked by bulldozing, plowing, discing, or the like, the device can first be drawn by a tractor with the blade 22 forward to smooth out and level uneven spots by light grading and thus prepare the soil for seed bed preparation. The adjustable hinged blade 22 extends slightly below the members 17 and spreads the soil evenly. When so used attached to a tractor with a hydraulic or mechanical lift, the device can be backed up close to buildings, fences, and the like. Also, when drawn by a tractor, several of the implements can be used at the same time, one being supported from the mechanical lift of the tractor by the posts 5, 6 and 7 and one or more other implements being drawn by means of the draft attachment 11.

Various advantages are obtained by use of a device made in accordance with this invention. As already pointed out, the grooving of the soil helps to prevent erosion and baking or crusting of the soil surface by the sun. The V-shaped members 17 press down into the soil to firm it. By using the attachment clips 19 for removable attachment to the ledges 15 and 16, any broken or damaged member 17 can be easily replaced. By forming the front ends of the members 17 into closed prows 18, the implement can pass over weeds, rocks, and the like, without clogging the members 17.

It will be apparent to those skilled in the art that various changes may be made in the invention, without departing from the spirit and scope thereof, and therefore the invention is not limited by that which is shown in the drawings and described in the specification, but only as indicated in the appended claims.

I claim:

1. An agricultural implement comprising a frame, draft attachment means on said frame, a pair of spaced parallel transverse ledges facing each other on said frame and a plurality of V-shaped members slidably supported in parallel relationship by a pair of clips facing away from each other and snugly engaging said ledges.

2. An agricultural implement comprising a frame, draft attachment means on said frame, two pairs of spaced parallel transverse ledges facing each other on said frame, a set of V-shaped members slidably supported in parallel relationship by a pair of clips facing away from each other and snugly engaging the ledges of each pair, the V-shaped members of one pair being staggered relative to the V-shaped members of the other pair.

References Cited in the file of this patent

UNITED STATES PATENTS

| | | |
|---|---|---|
| 862,718 | Davis | Aug. 6, 1907 |
| 2,643,595 | Jackson | June 30, 1953 |
| 3,026,946 | Rizer | Mar. 27, 1962 |